March 8, 1932.  A. BRIECHLE  1,848,693
VIEW FINDER
Original Filed June 28, 1930  4 Sheets-Sheet 1

INVENTOR
Ambrosius Briechle
BY
ATTORNEYS

March 8, 1932. A. BRIECHLE 1,848,693
VIEW FINDER
Original Filed June 28, 1930 4 Sheets-Sheet 2
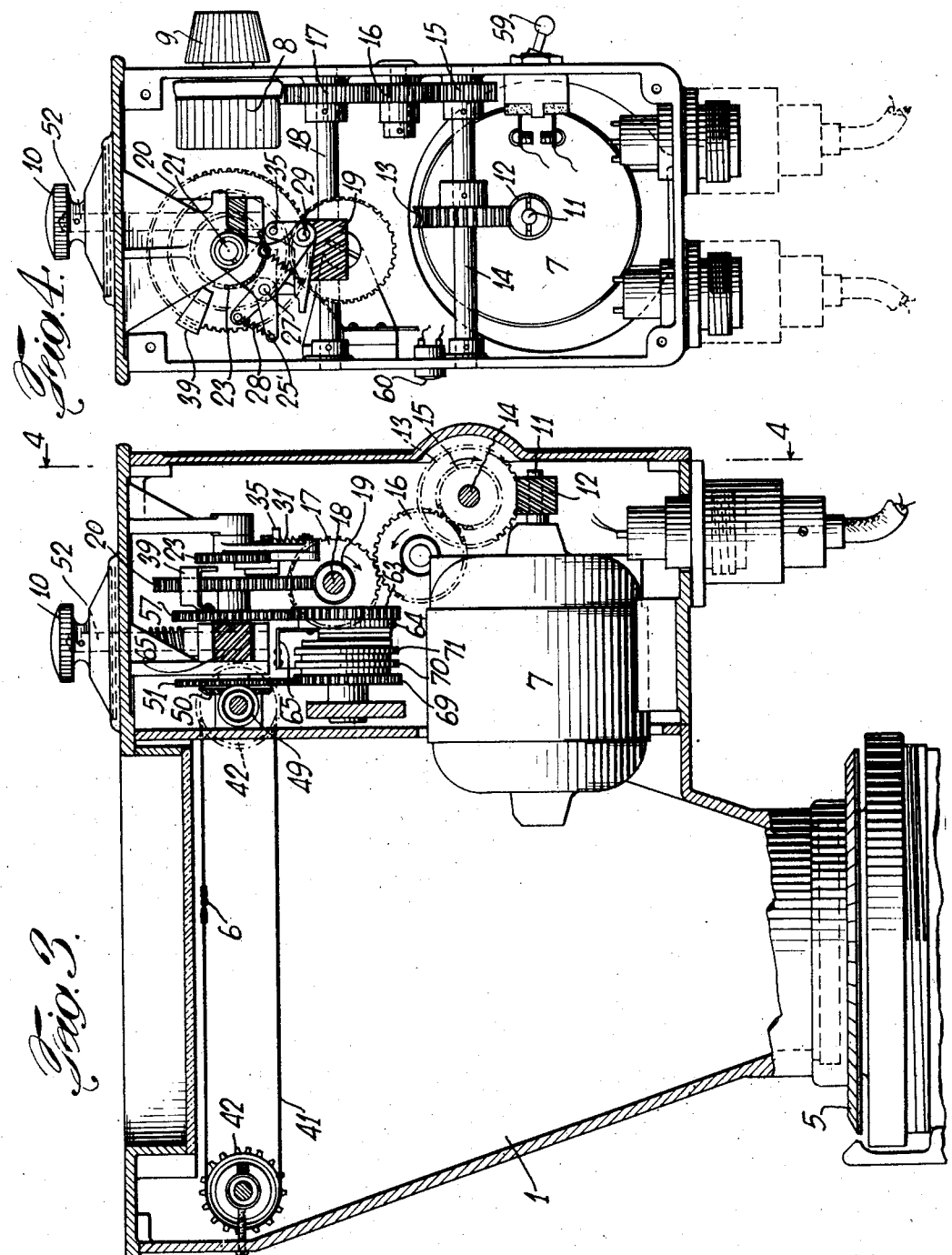
INVENTOR
Ambrosius Briechle
BY
ATTORNEYS March 8, 1932. A. BRIECHLE 1,848,693
VIEW FINDER
Original Filed June 28, 1930 4 Sheets-Sheet 3
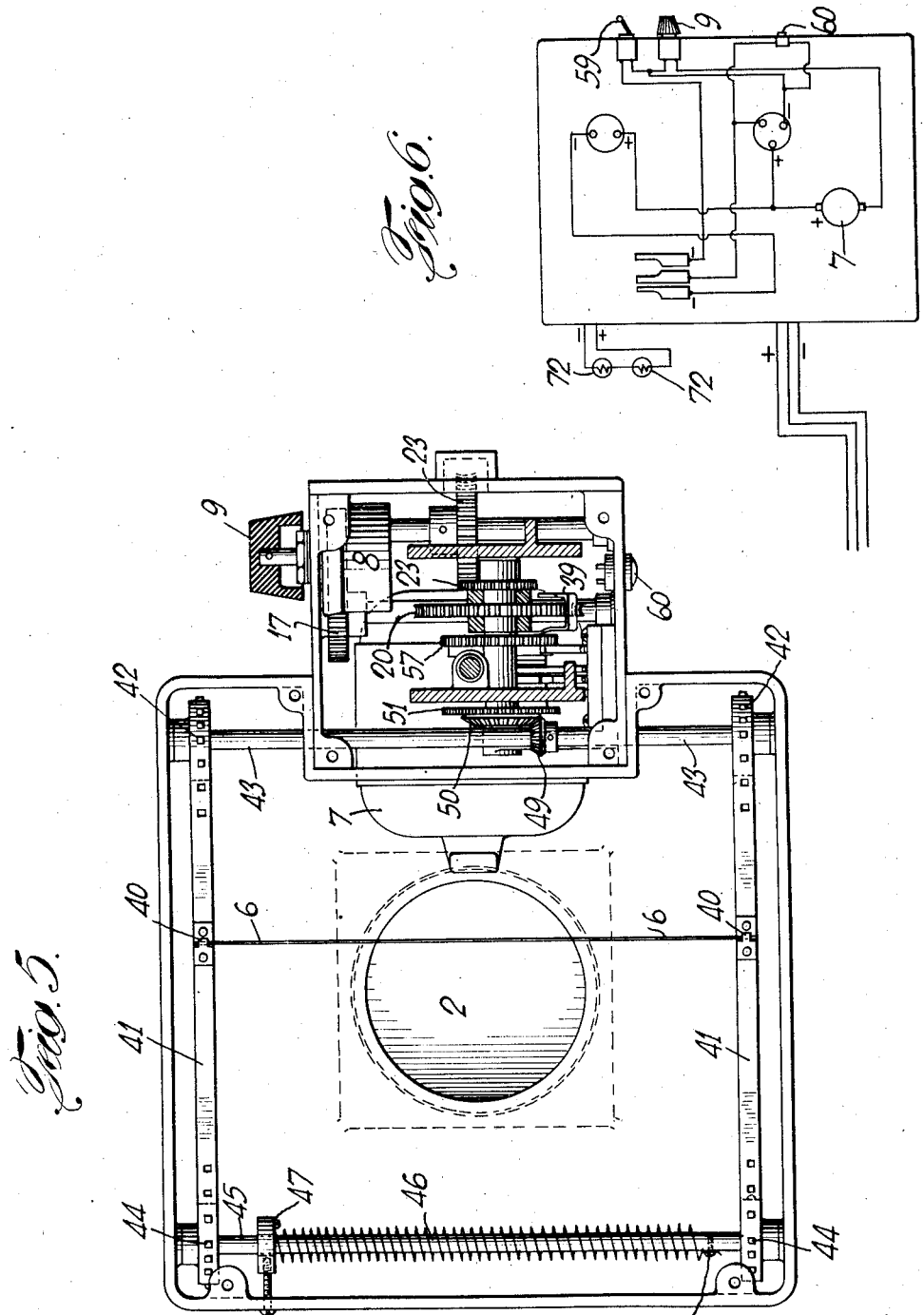
INVENTOR
Ambrosius Briechle
BY
ATTORNEYS March 8, 1932. A. BRIECHLE 1,848,693
VIEW FINDER
Original Filed June 28, 1930 4 Sheets-Sheet 4
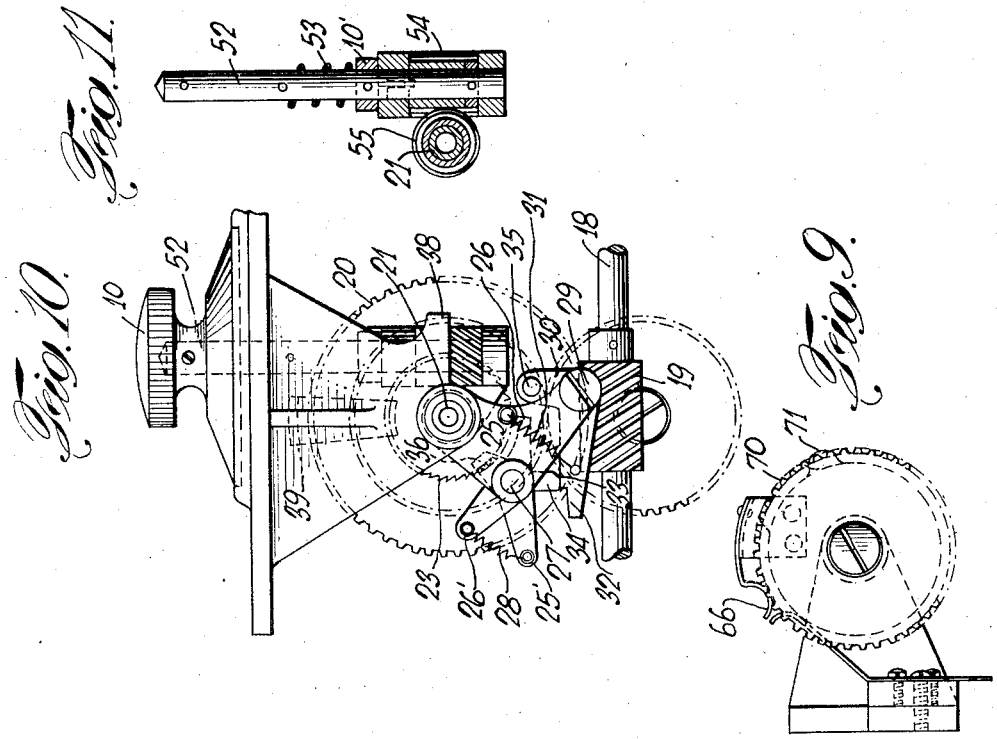
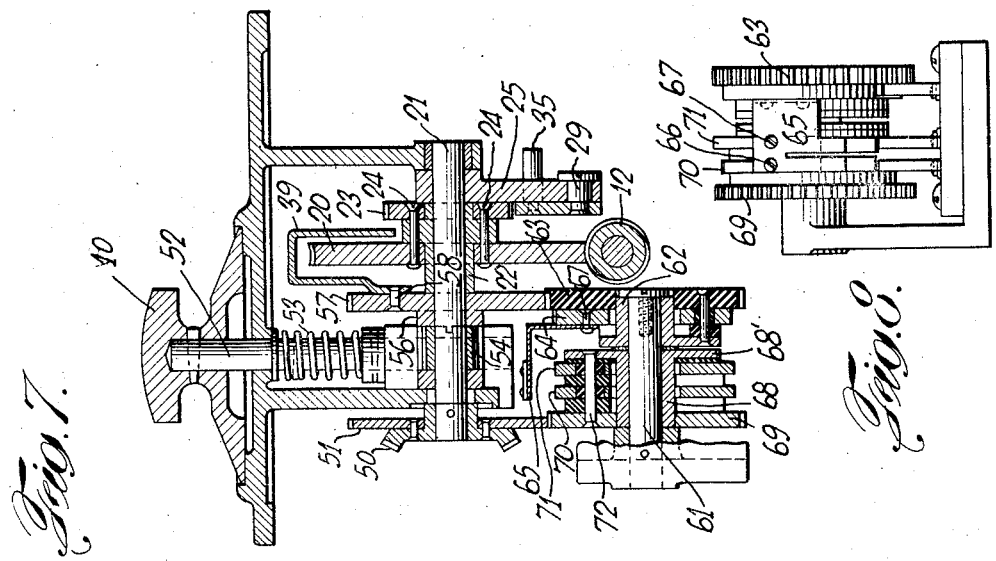
INVENTOR
Ambrosius Briechle
BY
ATTORNEYS Patented Mar. 8, 1932

1,848,693

UNITED STATES PATENT OFFICE

AMBROSIUS BRIECHLE, OF NEW YORK, N. Y., ASSIGNOR TO FAIRCHILD AERIAL CAMERA CORPORATION, OF NEW YORK, N. Y., A CORPORATION OF NEW YORK

VIEW FINDER

Application filed June 28, 1930, Serial No. 464,541. Renewed December 14, 1931.

This invention relates in general to photography and more particularly to improvements in accessories and equipment for aerial photographic apparatus.

The object of this invention is to provide a simply constructed, durable and light apparatus for more efficiently making vertical aerial photographs for mapping purposes.

Another object is to provide an improved means in the form of a track and interval meter for use with aerial cameras, particularly adapted to vertical photographic mapping.

Another object of the invention is to provide means whereby any desired overlapping of terrain shown on consecutive photographic exposures may be predeterminedly obtained and consistently secured.

The invention further comprises the combination with an aerial camera and lens, of a member movable across the plane of the image reproduced by the lens, of a rheostat for synchronizing the speed of travel of the movable member with that of the visible movement of the image across the lens, means for causing the movable member to trip at a predetermined point in its travel and to return to normal zero position, and means for simultaneously operating the exposure lever of the camera.

The invention further comprises a view finder including means whereby simple adjustments may be made to vary the frequency of operation of the view finder and its control of the camera in accordance with the size of photo-sensitive material employed, electrical means whereby the aircraft pilot and photographer are notified prior to an automatically controlled tripping of the shutter, means whereby the view finder may be operated independently of the camera so as to constitute an efficient ground speed indicator, and means whereby single exposures may be taken independently of the operation of the view finder while the latter is in working co-operation with the shutter tripping mechanism, this working cooperation continuing uninterruptedly after such single exposure has been made without any intervening adjustments or manual effort.

With the foregoing and other objects in view, the invention consists in the combination of parts and in the details of construction hereinafter set forth in the following description and appended claims, certain embodiments being illustrated in the accompanying drawings, in which:

Figure 3 is a view in longitudinal vertical section through the view finder, showing the operating mechanism in side elevation.

Figure 4 is a view in section taken along line 4—4 of Figure 3 showing the operating mechanism in rear elevation.

Figure 5 is a top plan view similar to that of Figure 1, with the top covering removed from the view finder.

Figure 6 is a wiring diagram of the electrical control units of the view finder.

Figure 7 is a view similar to that of Figure 3 showing in enlarged detail, part of that shown in Figure 3.

Figure 8 is a detail view in side elevation of the electrical contacts mechanically operated by the mechanism of the view finder.

Figure 9 is a detail view in end elevation of that shown in Figure 8.

Figure 10 is a view similar to that of Figure 4, showing in enlarged detail, part of that shown in Figure 4.

Figure 11 is a detail view of the hand-set operating shaft for adjusting the view finder according to the size of the photo-sensitive material employed in the camera.

Figure 1:
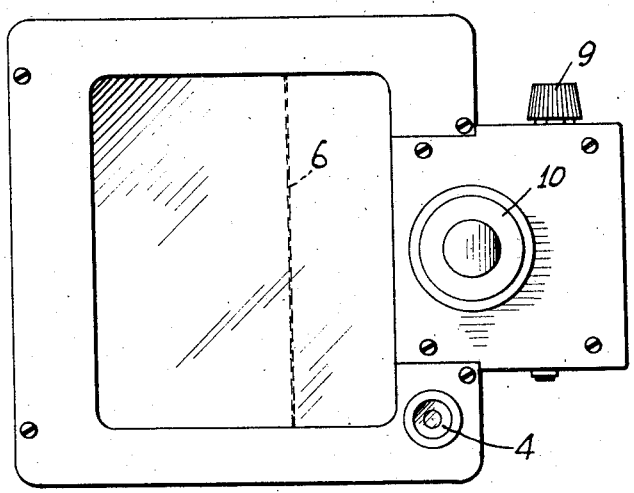
Figure 1 is a top plan view of the view finder.
Figure 2:
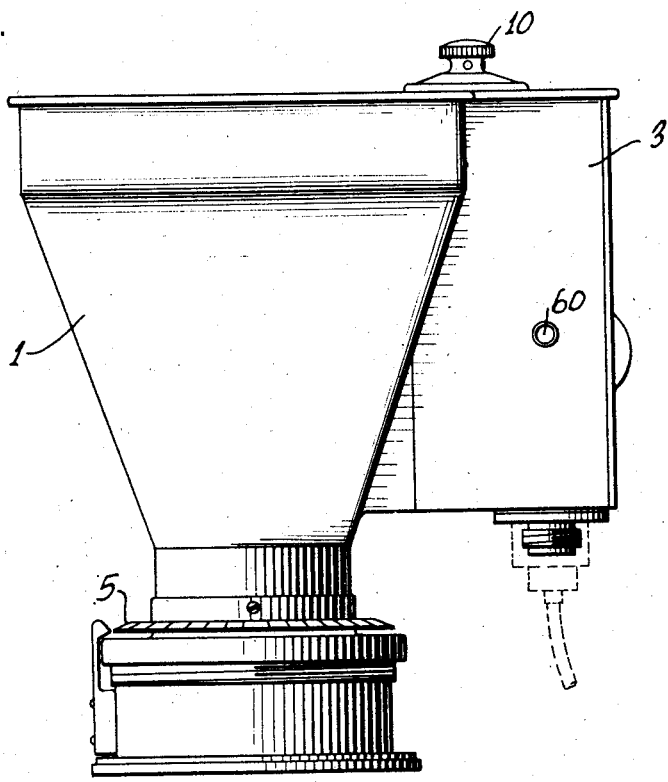
Figure 2 is a view in side elevation of the view finder.

Referring more particularly to the drawings, the view finder comprises a cone 1, similar in shape to that of the cone of an aerial camera, and has a lens 2 arranged in the lower smaller end. A casing 3 is releasably secured to the cone and forms a housing for the controlling mechanism for the view finder. The cone and housing are mounted for universal movement jointly and dependently with such movements of a similarly mounted aerial camera, the view finder being provided with a bubble level indicator 4, and a rotation indicator 5.

The main purpose of the view finder is to provide an accurate and simple apparatus for synchronizing the taking of pictures for mapping purposes with speed of travel of the aeroplane, which apparatus will automatically function independently of the aeroplane propelling means, and independently of a barographic or other types of instruments and which will eliminate calculations in the operation of the view finder or the camera.

In order to accomplish this result, mechanism is provided for moving a wire 6 across the field of vision. This mechanism is operated by an electric motor 7, the speed of which is regulated by a rheostat 8, adjusted by a hand knob 9. Thus, the speed of travel of the wire 6 being hand controlled, the photographer while in flight may pick an object on the terrain so that the object and the wire fall directly in his line of vision, and if the two remain in such relation while the wire moves, the photographer has synchronized the speed of operation of the camera with that of the aircraft in which he is flying, and should this not be instantly obtained, an adjustment by the knob 9 to the proper extent will bring about this desired condition.

It has been found that an overlap of sixty percent is desirable in taking aerial pictures for mapping purposes and the actual commercial view finder forming the basis of this specification was built with that preference in mind. The view finder, however, is not limited in its application to this extent, and neither is it limited in use to any particular type of camera. It may be used in connection with plate or film cameras of a wide range of sized plates or film. To avoid calculations for differences in sizes of sensitive material to be exposed upon each shutter trip, automatic mechanism is provided for moving the wire 6 and, after a predetermined distance of travel (from right to left in Figure 1), is intermittently returned to zero, whereupon it repeats its travel. Obviously at a given altitude and speed of the aircraft the interval between exposures must be commensurate with the size of the plate or film and must be varied according to the size of the plate or film used in the camera. This adjustment is brought about by turning the knob 10 which is graduated in numbers corresponding to the number of inches in length of the plate or film.

The operating mechanism for the view finder comprises an electric motor 7 with a driven rotary shaft 11 carrying a worm gear 12. A concave ring gear 13 mounted to rotate with a shaft 14 meshes with and is driven by the worm 12. A ring gear 15 also mounted to rotate with shaft 14 is rotated thereby and drives a gear 17 through the idler gear 16. Gear 17 is carried by a rotary shaft 18 which also carries a worm 19 which is thus rotated by the motor 7.

On a rotatable shaft 21 is loosely fitted a sleeve 22 which carries thereon a ring gear 20 and a ratchet 23 releasably bolted at 24 together and to the sleeve. The ring gear 20 meshes with the worm 19 and is driven thereby and this rotary motion is therefore imparted to the ratchet 23. Keyed to the shaft 21 is an excentric plate 25 which carries a pawl 26 which is intermittently caused to engage the ratchet 23, whereby rotary motion is likewise intermittently imparted to the shaft 21. In order to obtain this result the pawl is pivoted to the plate at 27, and a tension spring 28, arranged between the ends 25' and 26' of the plate and pawl respectively, tends to keep the pawl in engagement with the ratchet. Pivotally secured at 29 to the plate 25 is a lever 30, urged by the tension spring 31 to rotate in a clockwise direction. On one arm of this lever are arranged a lower level 32 and a higher level 33. When the projection 34, which is integral with the pawl 26 rides on the higher level 33, the pawl tooth engages the ratchet, but when the projection 34 is maintained on the lower level 32 by means of the inclined ridge between it and the higher level, the pawl tooth is restrained from engagement with the ratchet. When the plate 25 is rotated in a clockwise direction, this movement continues as long as the pawl engages the ratchet, until the projection 36 of the pawl strikes the adjustable stop 39, thus causing the projection 34 to be rotated into engagement with the lower surface 32 and the pawl to be disengaged from the ratchet. The plate being excentrically mounted rotates under spring tension in the opposite direction and when the pin 35 of the lever 30 strikes the casing projection 38 the lever is rotated counterclockwise against the action of the spring 31 allowing the projection 34 of the pawl to rise to the upper surface 33 and the pawl tooth to engage the ratchet. This cycle of operation continues as long as the shaft 11 of the motor is driven.

The wire 6 has its ends connected at 40 to suitable belts 41 provided with perforations for engagement with sprockets 42 mounted on a rotary shaft 43 and sprockets 44 mounted on a rotary shaft 45 thus making the shafts 43 and 45 operate in unison. A spring 46 coiled about the shaft 45 and attached thereto at 48 and to a loose collar 47, surrounding the shaft, resists a rotation of the shafts and sprockets in a direction which would cause the wire 6 to be moved forward (from right to left as shown in Figure 5). Shaft 43 has keyed thereto a bevel gear 49 and shaft 21 has a bevel gear 50 keyed thereto for meshing with and driving gear 49. Thus when the pawl 26 engages the ratchet 23 the shaft 21 being rotated the wire 6 is driven forwardly, and when the pawl is disengaged from the ratchet by striking the adjustable stop 39, the drive being discontinued, the spring 46 returns the wire 6 to its normal zero position.

The dialed knob 10 has been referred to as for the purpose of setting predetermined intervals between exposures of the camera. The action of the camera being dependent upon and in perfect synchronization with the view finder, the extent of travel of the wire 6 must also be in synchronism. A movement of the knob 10 moves the shaft 52 and the coil spring 53 forces shaft 52 down against the collar 10'. The shaft 52 is offset from the shaft 21 and has a keyed worm 54 which meshes at right angles with a worm 55 formed on a sleeve 56 which is loosely mounted on the shaft 21. Also integral with the sleeve 56 is a ring gear 57 and the stop 39 is secured thereto at 58, rendering the stop adjustable as to its position by the knob 10.

Mounted upon a stationary shaft 61 is a sleeve 62 upon which a ring gear 63 of insulating material may rotate, being driven by the adjustment ring gear 57 with which it meshes. Carried by the insulating gear is a cam 64 which also carries a metallic contactor 65, bolted at 67 and provided with an indented contact surface 66. Also mounted on the shaft 61 is a rotatable sleeve to which is fixed a ring gear which meshes with and is driven by a ring gear 51 keyed to the bevel gear 50. Arranged around the sleeve 68 and between its flange 68' and the ring gear 69 are cams 70 and 71 secured to the flange and gear by the bolts 72. These cams are driven by the gears 51 and 69 rotated correspondingly with the direction and extent of rotation of the shaft 21. Likewise the adjustment of the knob 10 through the means of the gears 57 and 63 causes a variance in the relative positions of the contact surface 66 with the cams 70 and 71 which intermittently engage this contact surface. The cam 64 however is in constant contact therewith.

As hereinbefore stated the view finder may be operated in conjunction with or independently of the camera. The sequence of operation of the view finder for its intended main purpose is as follows:

The view finder motor 7 is started and through the means described the wire is automatically intermittently moved forward and released to spring back to zero position. The proper adjustment has already been made in accordance with the size film or plate used in the camera, this adjustment resulting in a movement of the stop 39 to advance or retard the disengagement of the pawl 26 from the ratchet 23, and a movement of the contact surface 66 to correspondingly advance or retard the contact therewith by the cams 70 and 71.

The photographer picks an object on the terrain through the lens 2 and observes its apparent movement relative to the forward movement of the wire 6, and by regulating the speed of the motor 7 by adjusting the rheostat knob 9, the movements of the wire and the object on the terrain may be synchronized.

The switch lever 59 may then be operated to electrically connect the motor driven camera with the view finder. The camera employed is preferably the automatic electrically driven type employing a solenoidal shutter tripping device, it being understood that the sequence of the camera is inherently provided for with the exception that the electrical shutter tripping device of the camera is controlled by the action of the view finder. When the pawl 26 is engaged with the ratchet 23 and is thus driven clockwise, the shaft 21 being rotated drives gear 50 to advance the wire 6 and gear 51, which, in turn, drives gear 69 to rotate the cams 70 and 71. The excentric of the cam 70 is arranged in advance of that of the cam 71 in the direction of rotation and is of greater dimensions. Upon the contact of cam 70 with the contact surface 66 bulbs 72 are lighted and remain lighted for the duration of this contact. The lights are warning signals to both the pilot and the photographer that with a small predetermined lapse of time the camera shutter will be tripped, and this latter is effected when the cam 71 contacts with surface 66 thus completing an electric circuit with the electrical shutter tripping mechanism of the camera. This contact occurs practically simultaneously with the disengagement of the pawl 26 with the ratchet 23 and the camera automatic film winding or plate shifting apparatus operates to bring the sensitized material in proper position for the next photographic exposure during the period of time consumed by the return of the spring 46 to zero position, after which the drive of the plate 25 and the shaft 21 is again effected by the engagement of the pawl 26 with the ratchet for a repetition of this cycle.

An auxiliary circuit is also provided whereby a switch under the control of a push button 60 may effect a single immediate tripping of the camera shutter, the camera of course being subsequently wound by its own motor. This push button is spring actuated and immediately effects the completion of the circuit to make this single exposure, the circuit thereafter being incomplete upon a release of the push button. Moreover, this single exposure may be thus obtained irrespectively of the otherwise controlling parts of the view finder and the phase of operation and the interrelation thereof.

The view finder thus functions as a positive and accurate means for predetermining the amount of overlap of the adjacent photographs in an automatically taken series independently of reliance upon or calculations derived from such ordinary aeroplane instruments as altimeters, or ground-speed, air-speed, or drift indicators and further operates as an intervalometer or control of the camera shutter trip and the interval between photographic exposures.

The view finder independently of the camera provides an excellent drift indicator and moreover may readily be employed as a ground speed indicator, calculations from observations of the travel of the cross wire in relation to an object on the terrain being dependent only upon a knowledge of the altitude of the aircraft and the actual speed of travel of the crosswire, which latter is readily computable from rheostat readings in the control of the view finder motor.

Having thus described my invention, I claim:

1. In combination with an automatic camera adapted to be carried in an aircraft, a device including a lens, a prime mover, and a hand operated speed controlling member therefor, an element movable across said lens and within the field of vision and driven by said prime mover, for the purpose of enabling a synchronization of the rate of movement of said element with the apparent movement of an object on the terrain below as observed through said lens, means for operating said device and said camera independently of each other and for rendering the operation of the camera controllable by said device, said means comprising a rotatable cam and a means for automatically effecting a drive from said prime mover to said movable element and said cam, and a single adjustment member for simultaneously regulating the frequency of disengagement of such drive and the closing of an electrical circuit by said cam at a given speed of said prime mover for predeterminedly regulating the frequency of photographic exposures of said camera and the amount of overlap of the photographic images on the adjacent photographs in a series.

2. In combination with an automatic camera adapted to be carried in an aircraft, a device including a lens, a prime mover, and a hand operated speed controlling member therefor, an element movable across said lens and within the field of vision and driven by said prime mover, for the purpose of enabling a synchronization of the rate of movement of said element with the apparent movement of an object on the terrain below as observed through said lens, a train of gears for positively operating a gear about a shaft, a ratchet carried by said gear about said shaft, an excentric keyed to said shaft and provided with a pawl engageable with said ratchet for causing said shaft to be driven, gears operated by said shaft for driving said element forwardly, and means operated by said last named gears for rotating circuit closing cams for operating said camera.

3. In combination with an automatic camera adapted to be carried in an aircraft, a device including a lens, a prime mover, and a hand operated speed controlling member therefor, an element movable across said lens and within the field of vision and driven by said prime mover, for the purpose of enabling a synchronization of the rate of movement of said element with the apparent movement of an object on the terrain below as observed through said lens, a train of gears for positively operating a gear about a shaft, a ratchet carried by said gear about said shaft, an excentric keyed to said shaft and provided with a pawl engageable with said ratchet for causing said shaft to be driven, gears operated by said shaft for driving said element forwardly, and means operated by said last named gears for rotating circuit closing cams for operating said camera, and a single hand operated member for advancing or retarding a bracket for disengaging said pawl from said ratchet to discontinue the drive of said shaft and for simultaneously and proportionately advancing or retarding the contacts to be engaged by said cams upon rotation for consecutively energizing a warning signal and a tripping of the shutter of said camera.

4. In combination with an automatic camera adapted to be carried in an aircraft, a device including a lens, a prime mover, and a hand operated speed controlling member therefor, an element movable across said lens and within the field of vision and driven by said prime mover, for the purpose of enabling a synchronization of the rate of movement of said element with the apparent movement of an object on the terrain below as observed through said lens, a train of gears for positively operating a gear about a shaft, a ratchet carried by said gear about said shaft, an excentric keyed to said shaft and provided with a pawl engageable with said ratchet for causing said shaft to be driven, gears operated by said shaft for driving said element forwardly, and means operated by said last named gears for rotating circuit closing cams for operating said camera, and a single hand operated member for advancing or retarding a bracket for disengaging said pawl from said ratchet to discontinue the drive of said shaft and for simultaneously and proportionately advancing or retarding the contacts to be engaged by said cams upon rotation for consecutively energizing a warning signal and a tripping of the shutter of said camera, and means for returning said element, said cams and said pawl carrying excentric to a normal zero position for a subsequent engagement of said pawl with said ratchet and repetition of said cycle of operation.

5. In combination with an automatic camera adapted to be carried in an aircraft, a device including a lens, a prime mover, and a hand operated speed controlling member therefor, an element movable across said lens and within the field of vision and driven by said prime mover, for the purpose of enabling a synchronization of the rate of movement of said element with the apparent movement of an object on the terrain below as observed through said lens, a rotatable cam adapted to be moved into a position for closing a camera shutter tripping circuit, a ring gear rotatably mounted on a shaft and carrying a ratchet, a worm gear for driving said ring gear, said worm being driven by said prime mover through a train of gears, an excentric mounted on said shaft and carrying a pawl adapted to engage said ratchet, a sprocket operated belt for carrying said movable element, gears secured to said shaft for driving said sprockets and said cam, hand operated adjustment means for advancing or retarding the contact plate adapted to be engaged by said cam, and for simultaneously and correspondingly advancing an adjustable bracket, the engagement of which with said pawl effects the disengagement thereof with said ratchet.

6. In combination with an automatic camera adapted to be carried in an aircraft, a device including a lens, a prime mover, and a hand operated speed controlling member therefor, an element movable across said lens and within the field of vision and driven by said prime mover, for the purpose of enabling a synchronization of the rate of movement of said element with the apparent movement of an object on the terrain below as observed through said lens, a rotatable cam adapted to be moved into a position for closing a camera shutter tripping circuit, a ring gear rotatably mounted on a shaft and carrying a ratchet, a worm gear for driving said ring gear, said worm being driven by said prime mover through a train of gears, an excentric mounted on said shaft and carrying a pawl adapted to engage said ratchet, a sprocket operated belt for carrying said movable element, gears secured to said shaft for driving said sprockets and said cam, hand operated adjustment means for advancing or retarding the contact plate adapted to be engaged by said cam, and for simultaneously and correspondingly advancing an adjustable bracket the engagement of which with said pawl effects the disengagement thereof with said ratchet, means carried by said excentric for maintaining said pawl in engagement with said ratchet prior to the abutment of the pawl with said bracket and out of engagement subsequent to said abutment, a stationary casing projection for abutment by said excentric for restoring such engagement.

7. In a view finder for an aerial camera, a gear driven and spring returned cross wire, a gear driven camera shutter tripping circuit closing cam, pawl and ratchet means for effecting the drive from gears operated by the prime mover of said view finder, hand operated means for synchronously adjusting the operation of the cam and the cross wire through the intermediate adjustment of the limits of operation of said pawl in its engagement with said ratchet.

In testimony whereof, I have signed my name to this specification.

AMBROSIUS BRIECHLE.